April 23, 1929.  E. R. LORAM  1,710,631

UNIDIRECTIONAL DRIVING GEAR

Filed July 11, 1927

Inventor
Edward Rundle Loram.
Per. Rayner Ho
Attorneys.

Patented Apr. 23, 1929.

1,710,631

UNITED STATES PATENT OFFICE.

EDWARD RUNDLE LORAM, OF LONDON, ENGLAND, ASSIGNOR OF ONE-THIRD TO DAVID STEEL ALEXANDER AND ONE-THIRD TO THEODORE PHILLIPS, BOTH OF ESSEX, ENGLAND.

UNIDIRECTIONAL DRIVING GEAR.

Application filed July 11, 1927, Serial No. 204,954, and in Great Britain July 16, 1926.

This invention relates to a novel means of transmitting rotation from one rotary member to another, for instance, what might be referred to purely in an illustrative sense as a novel method for the transmission of rotation from a primary rotary member to a secondary rotary member. Adopting this simile, the object of this invention is to provide means whereby the direction of rotation imparted to the secondary member is constant irrespective of the direction of rotation of the primary member. This invention is particularly useful in connection with appliances in which it is desirable to have a constant direction of rotation of the equivalent to the secondary member, but when the direction of rotation of the equivalent to the primary member is not a reliable factor. The invention is thus applicable to any recording instrument desired to rotate in one direction only. An example of such an appliance is a well known form of gas meter for measuring and recording the quantity of gas employed in a building or passing through a selected conduit. The pressure of gas in these appliances is utilized to impart rotation to a primary rotary member which is responsible for the degree of movement imparted to a spindle carrying a pointer working over a graduated dial. Reliance is placed upon the direction of rotation of the primary member being constant to obtain proper recording of the mechanism, but sometimes the primary member is rotated in the wrong direction with a consequent failure of the recording mechanism to function correctly. This invention would obviate this disadvantage.

I am aware that heretofore it has been proposed to employ with speedometers and the like, gear for ensuring uniformity of direction of rotation of a spindle or shaft in which a primary rotary shaft carres a pair of gear wheels, only one of which meshes with a secondary gear wheel, the other being idle when the primary shaft rotates in one direction, and in which when the primary shaft rotates in a counter direction the other gear wheel which was idle is brought into mesh with the secondary gear wheel and the previously operative gear wheel moved to an idle position. Such device however entails the use of a friction device for effecting the change of gear wheels. It has also been proposed for use with ships' telegraphic or signalling apparatus to employ a mechanism for operating a speed indicator, in which uniformity of direction of rotation of a spindle of the indicator is obtained and by which a gear wheel fixed on the spindle is constantly meshed with a gear wheel which is adapted to receive rotation from a gear wheel mounted at the ends of a swinging arm and driven by a gear wheel secured to a primary rotary shaft, such swinging arm being frictionally carried by the primary rotary shaft so that according to the direction of rotation of said shaft depends whether the gear wheel carried by the said arm shall mesh with the gear wheel which is constantly in mesh with the said gear wheel fixed on the indicator spindle, or mesh directly with the indicator spindle gear wheel.

According to the present invention a method of transmitting rotation from a primary member to a secondary member is characterized in that the primary member is adapted, when rotating in one direction, to establish driving connection with one of a pair of members which are adapted to rotate in unison in opposite directions, the said primary member being so arranged that when it rotates in the opposite direction it automatically establishes driving connection with the other one of the said pair of members, the said pair of members having associated with them means to prevent reversal of their direction of rotation.

In one embodiment of this invention the primary member comprises a worm screw mounted upon a rotatable shaft, the worm screw being free to move endwise of the shaft but held against rotation relative to the shaft. The worm screw meshes with one of a pair of meshing gear wheels, whereby the two gear wheels rotate in opposite directions. Either of these gear wheels can constitute the secondary member and means is provided to prevent the two gear wheels from having their directions of rotation reversed, for instance a pawl and ratchet device could be provided with the shaft of each gear wheel.

The worm on the shaft works between a pair of abutments which limit the endwise movement of the worm, and the arrangement is such that during normal operation of the device the worm is pressed against one of the abutments and meshing with one of the gear wheels, but should the direction of rotation of the worm shaft be reversed the gear wheels will not rotate owing to the pawl and ratchet or equivalent device, consequently the worm will gradually move out of mesh with one gear wheel by moving endwise along the shaft, and as it leaves the gear wheel its establishes engagement with the teeth of the other gear wheel and ultimately obtains a proper mesh with a consequent transmission of rotation of the gear wheels.

In another embodiment of this invention, instead of employing a worm slidable upon a shaft, I provide a primary gear wheel which is supported by a swinging arm. This primary gear wheel meshes with one of the two secondary meshing gear wheels and should the direction of rotation of the primary gear wheel to be reversed the rotation of the secondary gear wheels will be arrested, with the result that the primary gear wheel will travel off the gear wheel with which it is meshing and engage the other gear wheel, with a consequent re-establishment of the transmission of rotation.

In order that my invention may be more clearly understood and readily carried into effect, I have appended hereto a sheet of drawings somewhat diagrammatically illustrating the two embodiments hereinbefore referred to, and in which:—

Fig. 1 illustrates the first embodiment referred to, and

Figure 1:
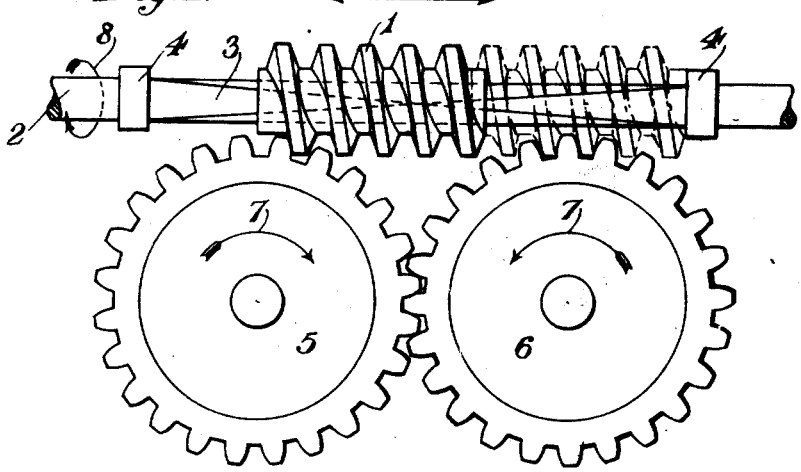

Referring to Fig. 1 of the drawings the primary rotary member comprises a worm 1 mounted upon a rotatable shaft 2 which can receive its motion from any suitable source. The worm 1 is in the form of a sleeve having a squared or other convenient bore whereby it may slide endwise without rotating relatively upon a correspondingly sectioned part 3 of the shaft 2. The part 3 has abutments 4 at its ends to limit the endwise movement of the worm 1 which meshes with one of a pair of meshing gear wheels 5 and 6 which are free to rotate in the directions of the arrows 7, but are prevented from rotating in a counter direction by any suitable means. It will be appreciated that for the worm 1 to rotate the gear wheel 5 of the shaft 2 will have to rotate in the direction of the arrow 8, but should the shaft rotate in a counter direction the worm 1 will gradually feed itself along the portion 3 of the shaft 1 and establish driving engagement with the gear wheel 6, and assume the position shown in dot and dash lines in Fig. 1. This change is shown as just about to take place in Fig. 1.

Figure 2:
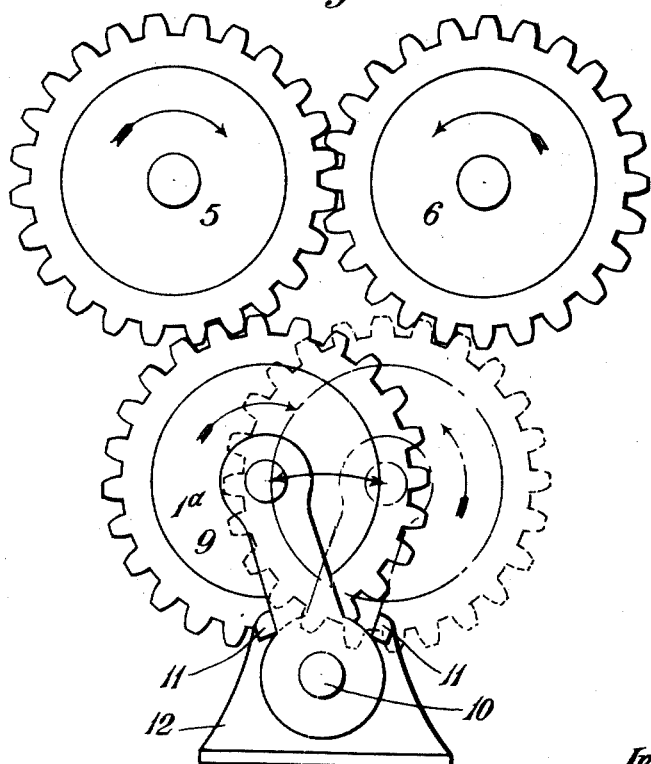
Fig. 2 illustrates the second embodiment.

In Fig. 2, the worm is substituted by a gear wheel 1ª carried in a bearing at the free end of an arm 9 pivotally supported upon a shaft 10, which could be the equivalent of the shaft 2 by providing thereon a gear wheel meshing with the gear wheel 1ª. Any other suitable method of rotating the gear wheel 1ª may be adopted. It will be seen that in order to rotate the gear wheel 5 the gear wheel 1ª would have to rotate in an anti-clockwise direction, and should the gear wheel 1ª rotate in a clockwise direction it will move out of mesh with the gear wheel 5 to the position shown in dotted lines in Fig. 2, and mesh with the gear wheel 6 with a consequent re-establishing of the transmission of rotation to the gear wheels 5 and 6. Abutments 11 limit the swinging movement of the arm 9, the abutments if desired being provided on a bracket 12 supporting the shaft 10.

I claim:—

1. Unidirectional driving gear comprising a primary driving member mounted for displacement to engage and drive either one of a pair of constantly-meshed oppositely rotating driven pinions mounted on parallel spindles and which is caused to pass from the one to the other of said driven pinions on the reversal of drive wholly by the effort which it exerts against the peripheral teeth of the driven pinions.

2. Unidirectional driving gear comprising a driving shaft, and a worm on said driving shaft mounted for displacement to engage and drive either one of a pair of constantly-meshed oppositely rotating driven pinions mounted on parallel spindles the worm being caused to pass from the one to the other of said driven pinions wholly by the effort which its peripheral helix exerts against the peripheral teeth of the driven pinions.

3. Unidirectional driving gear comprising a driving shaft and a worm mounted on said driving shaft so as to be rotated thereby but free to slide axially so as to engage and drive either one of a pair of constantly-meshed oppositely rotating driven pinions mounted on parallel spindles, the worm being caused to pass from the one to the other of said driven pinions wholly by the effort which its peripheral helix exerts against the peripheral teeth of the driven pinions.

EDWARD RUNDLE LORAM.